United States Patent
Whitehead et al.

[19]

[11] Patent Number: 5,967,354
[45] Date of Patent: Oct. 19, 1999

[54] FULLY ADJUSTABLE ELECTRICAL RECEPTACLE HOUSING

[75] Inventors: James H. Whitehead, Collierville; John C. Saxon, Memphis, both of Tenn.

[73] Assignee: Thomas & Betts International, Inc., Sparks, Nev.

[21] Appl. No.: 09/107,764

[22] Filed: Jun. 30, 1998

[51] Int. Cl.[6] .................................................. H02G 3/08
[52] U.S. Cl. .......................... 220/3.3; 220/3.7; 220/3.94
[58] Field of Search .............................. 220/3.2, 3.3, 3.4, 220/3.5, 3.6, 3.7, 3.8, 3.9, 3.92, 3.94, 4.02, 4.01, 4.26, 4.27, 23.89, 23.83, 23.86, 23.87, 23.88, 919

[56] References Cited

U.S. PATENT DOCUMENTS

| | | | |
|---|---|---|---|
| 740,663 | 10/1903 | Krantz | 220/3.7 |
| 1,928,198 | 9/1933 | Buchanan | 220/3.4 |
| 2,378,861 | 6/1945 | Peevey | 220/3.7 |
| 3,064,850 | 11/1962 | Kelly, Jr. | 220/3.7 |
| 3,405,834 | 10/1968 | Butler et al. | 220/3.94 |
| 3,428,203 | 2/1969 | King et al. | 220/3.7 |
| 3,912,106 | 10/1975 | Traupe | 220/3.7 |
| 5,042,673 | 8/1991 | McShane | 220/3.7 |
| 5,683,005 | 11/1997 | Mordick | 220/3.7 |

FOREIGN PATENT DOCUMENTS 1388873  3/1975  United Kingdom ................. 220/3.4

*Primary Examiner*—Stephen Casatellano
*Attorney, Agent, or Firm*—Hoffmann & Baron, LLP

[57] ABSTRACT

A fully adjustable electrical receptacle housing used for mounting in a floor includes a junction box for receiving a conduit, a leveling tray and a receptacle cover for mounting an electrical termination device. The leveling tray is positioned within an opening of the junction box and is adjustable in any plane with respect to the opening. The receptacle frame is seated upon and is fully supported by the leveling tray without the need for mechanical connection to the tray.

8 Claims, 2 Drawing Sheets

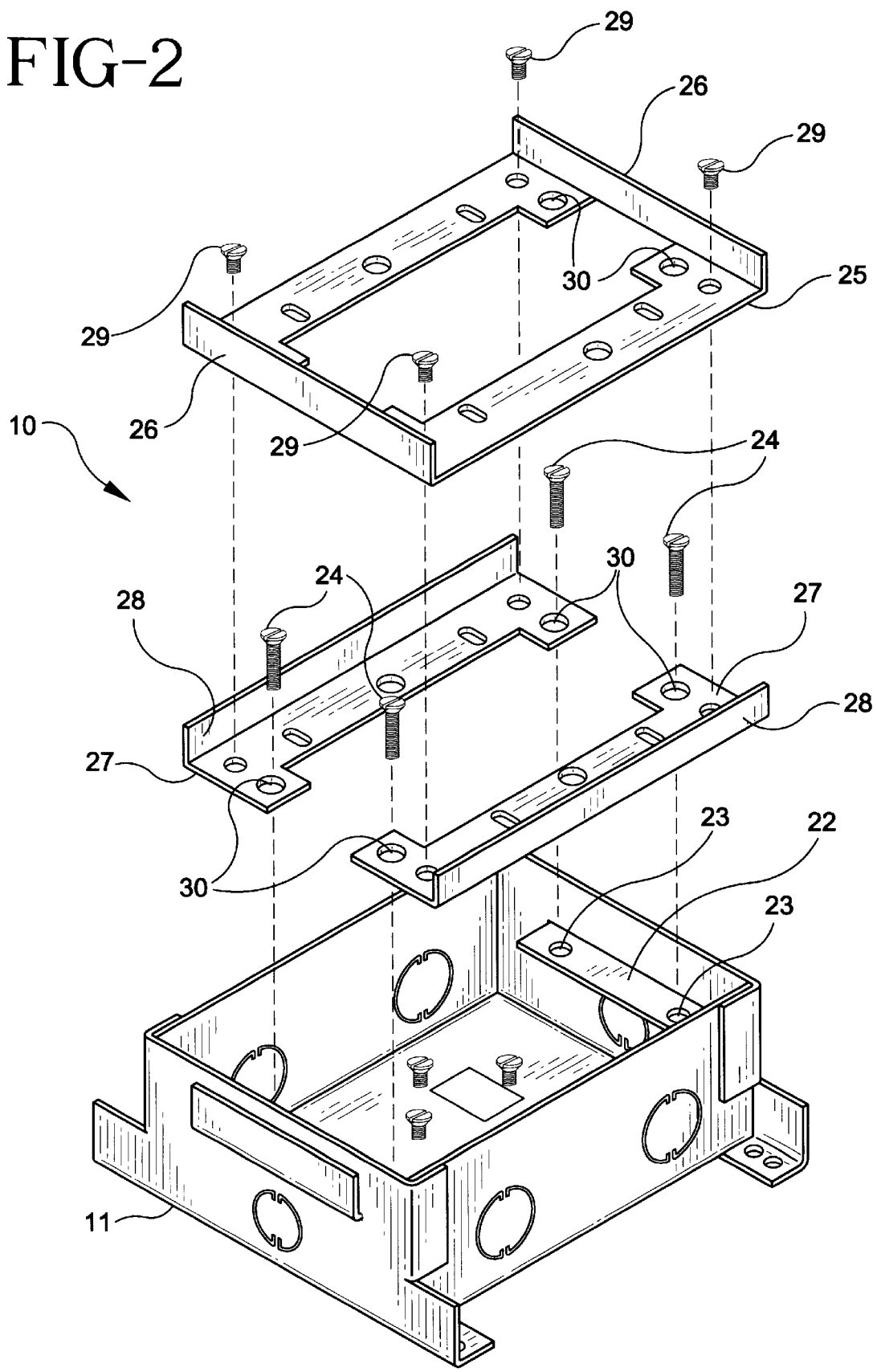

FULLY ADJUSTABLE ELECTRICAL RECEPTACLE HOUSING

FIELD OF THE INVENTION

The present invention relates to an adjustable electrical receptacle housing and more particularly relates to a floor mounted receptacle housing providing maximum adjustability without compromising support.

BACKGROUND OF THE INVENTION

In modem concrete construction it has become customary to provide conduits in the floors of a building over which concrete is poured to complete the floor. These conduits provide passages for electric wiring, telephone cables and the like. Receptacle housings through the concrete floor are provided at desired positions and suitable fixtures are mounted in the receptacles to provide power and telephone and data connections. These receptacle housings are closed on all sides except where joined to conduits and except for the fronts of the housings which face the openings in the floor. The receptacle housings are typically provided with a cover plate upon which the electrical fixture is mounted.

It is desirable that the open front of a receptacle housing be positioned adjacent to the surface of the floor so that when a fixture, such as a switch or outlet, is mounted in the receptacle the front of the switch or outlet will be substantially flush with the surface of the floor. However, difficulty is frequently encountered in correctly positioning the receptacle box and cover plate whereby the electrical fixture is properly flush with the finished floor. Because the receptacle housings are typically installed before the concrete is poured and before the finished floor surface is applied, it is difficult to estimate the proper location of the housing to insure that the front of the switch or outlet will be flush with the floor surface. If the receptacle housing protrudes out from the floor surface then the switch or outlet will appear unsightly and may present a tripping hazard on the floor surface. If the receptacle housing is too far recessed in the floor surface it may not be possible to mount the switch or outlet therein. This necessitates compensation through the use of shims or other mechanical adjustment mechanisms to attempt to bring the electrical fixture into proper flush relation with the exposed surface of the finished floor.

A number of adjustable electrical receptacle housings have been proposed to allow mounting a switch or outlet so that it is substantially flush with a wall or floor surface. For example, U.S. Pat. No. 4,634,015 to Taylor discloses an adjustable electrical outlet box attachment for mounting to a wall surface. The box includes a frame, mounted to slide forwardly and rearwardly within a collar, and adjustment screws mounted within the box frame to adjust the frame flush with the wall surface. Similarly, U.S. Pat. No. 4,599,485 to Smolik discloses a wall receptacle box which is adjustable through the use of two deformable mounting brackets. The mounting brackets are bendable in order to compensate for irregularities in the mounting surface so that the electric fixture box can be mounted flush with respect to the wall covering. Finally, U.S. Pat. No. 2,886,630 to Gill discloses an adjustable outlet box which is especially designed for use in poured concrete floors. The box includes adjustment screws which connect the outlet to the receptacle box and which may be adjusted to bring the outlet flush with the floor surface.

These and other conventional devices typically include adjustment mechanisms, such as screws, which are mechanically connected to the receptacle cover or outlet. As such, the adjustment mechanisms are also typically the means of supporting the cover or outlet. The result is a cover or outlet which is supported at only one or more points within the receptacle housing. In the case of a floor receptacle, supporting the cover or outlet in a multiple-point fashion may not be sufficient to withstand the weight of a person who may step on the receptacle. Also, mechanically connecting the cover or outlet to the receptacle box during installation or replacement is difficult and time consuming and results in limited adjustability. Accordingly, there is a need for an adjustable electrical floor receptacle housing providing maximum adjustability without compromising support of the cover or outlet.

OBJECTS AND SUMMARY OF THE INVENTION

It is an object of the present invention to provide an adjustable electrical floor receptacle housing providing maximum adjustability without compromising support of the cover.

It is another object of the present invention to provide an adjustable electrical floor receptacle housing having adjustment means so that an electrical fixture may be leveled as well as set flush relative to the floor.

It is yet another object of the present invention to provide an adjustable electrical floor receptacle housing providing continuous perimeter support of the fixture cover and wherein the cover is not mechanically connected to the receptacle box.

In accordance with one form of the present invention, an adjustable electrical floor receptacle housing generally includes a junction box, a leveling tray and a receptacle frame for mounting an electrical outlet. Seated within the junction box is the leveling tray which may be adjusted relative to the junction box. The leveling tray includes adjustment screws which are rotatably fixed to the leveling tray and are connected to a flange of the junction box. When rotated in one direction, the adjustment screws move the leveling tray toward the opening of the junction box and when rotated in the other direction, the adjustment screws move the leveling tray away from the opening of the junction box.

In a preferred embodiment, the leveling tray comprises a top plate and two bottom plates which are fastened together. Trapped between the top and bottom plates are the heads of the adjustment screws such that the screws are rotatably fixed to the leveling tray when assembled together. The top and bottom plates also preferably include upwardly extending flanges which form four generally continuous side walls of the leveling tray when assembled.

The receptacle frame is seated on the leveling tray such that the perimeter of the frame is substantially supported by the leveling tray. The receptacle frame preferably includes through holes for access to the adjustment screws and resilient wedge clips which make contact with and bias against the inside surface of the side walls of the leveling tray to hold the frame securely in place. The receptacle housing assembly itself preferably includes external adjustment screws for adjustable mounting of the junction box to a building structure.

These and other objects, features and advantages of the present invention will become apparent from the following detailed description of the illustrative embodiments thereof, which is to be read in conjunction with the accompanying drawings.

BRIEF DESCRIPTION OF THE DRAWINGS

FIG. 2 is a perspective, partially exploded, view of the junction box and the preferred embodiment of the leveling tray formed in accordance with the present invention.

DETAILED DESCRIPTION OF THE PREFERRED EMBODIMENTS

Figure 1:
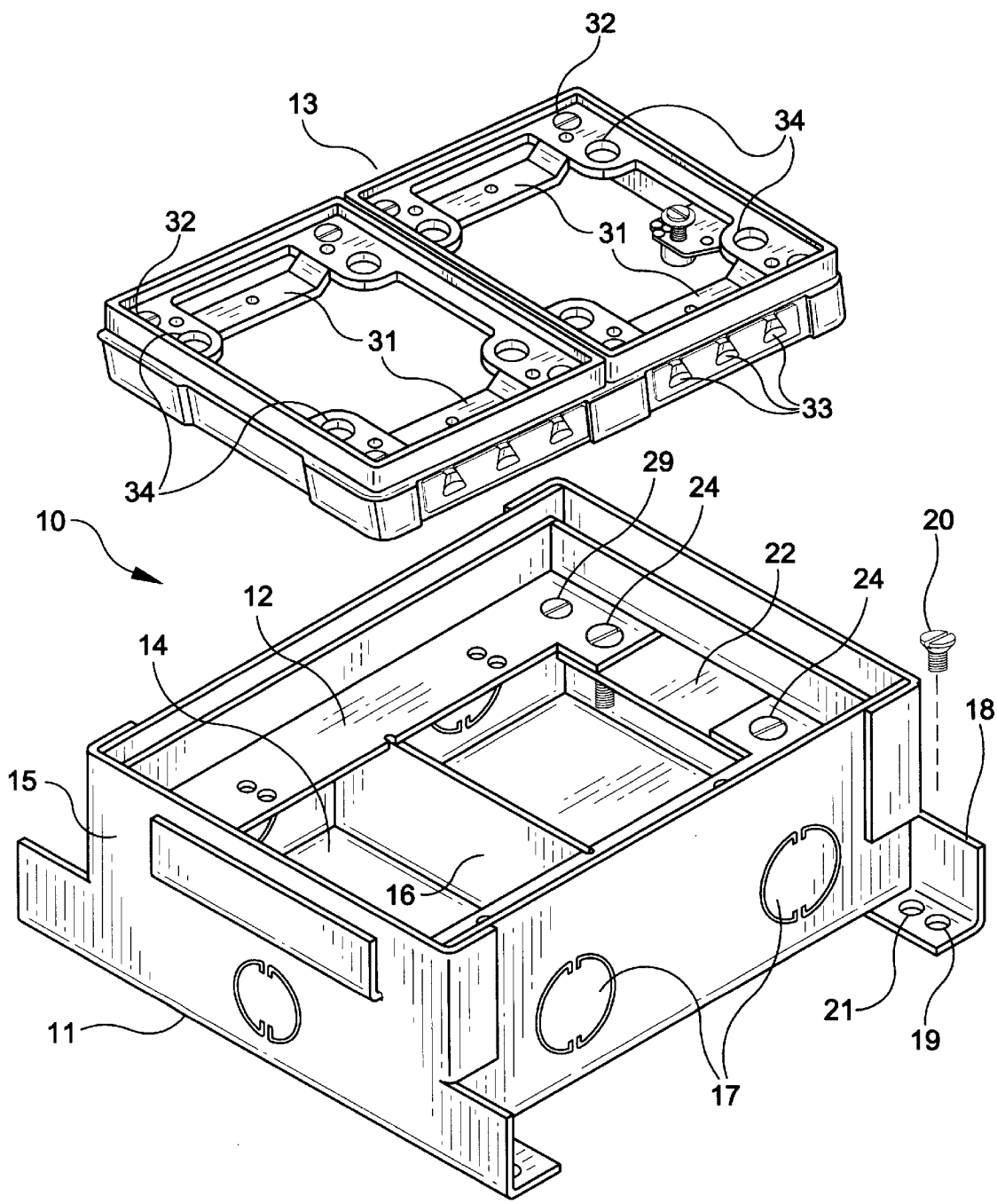
FIG. 1 is a perspective, partially exploded, view of the adjustable electrical receptacle housing formed in accordance with the present invention.

Referring to FIGS. 1 and 2, a fully adjustable electric receptacle housing 10 formed in accordance with the present invention is shown. The receptacle housing 10 generally includes a mountable junction box 11, a leveling tray 12, and a receptacle frame 13.

The junction box 11 is similar to conventional junction boxes used in the field of electrical wiring and installation. The junction box 11 shown in FIGS. 1 and 2 is rectangular-shaped having a base 14 and four sidewalls 15, however, any shape box may be used. The junction box 11 is preferably made of a lightweight electrically conductive material for grounding purposes. The junction box 11 may be formed from stamped and folded sheet metal pieces which are spot-welded together in a conventional manner known in the industry. The four sidewalls 15 of the junction box 11 define a front opening 16 which will face outwardly from the floor surface when the box is installed. The junction box 11 shown in FIGS. 1 and 2 is adapted for mounting two electrical fixtures, such as duplex electrical receptacles. However, the present invention may be employed in any configuration to accommodate a wide variety of electric termination components such as switches, receptacles as well as voice and data connectors.

The junction box 11 includes knock-out ports 17 for receiving electrical wires, cables or conduits through any side of the box. The junction box 11 also preferably includes external flanges 18 disposed on two opposing sidewalls. The flanges 18 include threaded holes 19, to receive external adjustment screws 20, and mounting holes 21 for external adjustment and mounting of the box to a building structure. The junction box 11 also includes at least one and preferably two adjustment flanges 22 extending inwardly from the inside surface of the sidewalls 15. The junction box 11 may be formed with one continuous flange extending around the perimeter of the sidewalls, however, for ease of manufacture, the box preferably includes two flanges 22 disposed on opposing sidewalls as shown in FIGS. 1 and 2. The flanges 22 include threaded holes 23 for receiving internal adjustment screws 24 from the leveling tray as discussed further below.

Disposed within the opening 16 of the junction box 11 is a leveling tray 12. The leveling tray 12 is generally a flat plate having a central opening and upwardly extending side walls 26 and 28. The leveling tray 12 is sized slightly smaller than the opening 16 of the junction box 11, the side walls 26 and 28 of the leveling tray being in close relationship with the sidewalls 15 of the junction box. The leveling tray 12 may be made from a single plate having internal adjustment screws rotatably fixed to the plate. In a preferred embodiment however, the leveling tray 12 comprises a top plate 25, having two upwardly extending flanges 26 disposed on opposing sides of the plate, and two end pieces 27, each having an upwardly extending flange 28, as shown in FIG. 2. The top plate 25 and the end pieces 27 are fastened together with attachment screws 29, or other fastening means, such that the flanges form a generally continuous upwardly extending side wall around the perimeter of the leveling tray 12.

Trapped between the top plate 25 and the end pieces 27 are the heads of internal adjustment screws 24. The top plate 25 and the end pieces 27 include coaxial adjustment screw holes 30 which are sized slightly smaller than the diameter of the adjustment screw heads but larger than the diameter of the threaded portion of the screw. Prior to fastening the top plate 25 to the end pieces 27, the internal adjustment screws 24 are inserted through the holes of the end pieces 27 such that the threaded portions of the screws extend downwardly away from the flanges 28. When the top plate 25 is fastened to the end pieces 27, the heads of the adjustment screws 24 are trapped between the bottom surface of the top plate and the upper surface of the end pieces. The adjustment screw holes 30 should be large enough to permit access to the adjustment screws 24 with a screwdriver while still rotatably maintaining the heads of the screws between the top plate 25 and the end pieces 27.

At least three adjustment screws 24, and preferably four, are desired for full plane adjustment of the leveling tray 12. The threaded portions of the adjustment screws 24 are connected to the threaded holes 23 of the adjustment flanges 22 of the junction box 11. When rotated in one direction, an adjustment screw 24 causes the leveling tray 12 in the area around the screw to rise toward the opening 16 of the junction box 11. When rotated in the other direction, the adjustment screw 24 pulls the leveling tray 12 in the area around the screw closer to the adjustment flange 22 and away from the opening of the junction box. Thus, it can be appreciated that one area of the leveling tray 12 may be moved in one direction while another area may be moved in an opposite direction so that the leveling tray may be adjusted in any plane relative to the opening in the junction box.

Seated on top of the leveling tray 12 is a receptacle frame 13 in which the electrical termination devices (not shown) are mounted. The receptacle frame 13 includes threaded connectors 31 for receiving screws of a fixture, such as a switch or an outlet, and threaded connectors 32 for mounting a fixture cover (not shown). The receptacle frame 13 shown in FIG. 1 is a dual-fixture frame, allowing for two electrical fixtures, such as duplex electrical receptacles, to be mounted in the housing, however, single or multiple frames of various construction may be substituted. The receptacle frame 13 is sized to fit snugly within the flanges 26 and 28 of the leveling tray 12. To ensure secure fitting of the receptacle frame 13 upon the leveling tray 12, resilient stainless steel wedge clips 33 are provided on the sides of the frame which contact and bias against the inside surfaces of the flanges 26 and 28 of the leveling tray. The receptacle frame 13 is also preferably provided with through-holes 34 for access to adjacent internal adjustment screws 24 of the leveling tray 12.

To install the electrical receptacle housing 10, the junction box 11 is first positioned within a recess of the floor. The external flanges 18 of the box 11 may be positioned against or on top of crossbeams or a flat surface depending on the construction of the floor. The external adjustment screws 20 of the flanges 18 are then adjusted to provide a rough leveling and positioning of the opening of the box relative to the finished floor. The box 11 may then be secured to the crossbeams or the support surface through the mounting holes 21 of the external flanges 18 by conventional means. One or more wires, cables or conduits (not shown) are then fed through the knock-out ports 17 of the box 11 and are connected to the box by conventional electric cable connectors. Concrete or other flooring material may then be poured or installed around the box 11 and the finished flooring material, such as carpet or tile, may be installed over the concrete. A protective cover (not shown) may be provided over the opening 16 of the junction box 11 to prevent concrete or other flooring material from entering the box during preparation of the floor. Once the floor is complete, the protective cover is removed and the leveling tray 12 of the housing may be adjusted to bring the receptacle frame 13 flush and level with the upper surface of the finished floor. Access to the adjustment screws 24 is provided by the through-holes 34 of the receptacle frame 13. The leveling tray 12 may initially be in a downward most position and rotation of the adjustment screws 24 brings the leveling tray 12 with the receptacle frame 13 up to the surface of the floor. Once the frame 13 is in position, the electrical fixtures, such as outlets or switches, may be connected to the wires or conduits within the receptacle housing. Conventional outlet or switch covers (not shown) are then secured to the receptacle frame 13 through the threaded connectors 32 of the frame.

Since the receptacle frame 13 is not mechanically attached to the leveling tray 12, or the junction box 11, it is easily replaced without the need for releveling or repositioning of the electrical termination devices. An electrician may simply disconnect, for example, an outlet or switch from the wires or conduit, and pull out the receptacle frame from the box. New components may then be wired and mounted to a new frame which is simply pushed back in place without the need for readjustment. Also, unlike conventional devices in which the fixture cover is supported in a multiple point fashion, the entire periphery of the receptacle frame 13 is supported by the leveling tray 12. This increased support allows the frame to better withstand any stresses which the receptacle housing might experience.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An adjustable electrical receptacle housing assembly comprising:
    a mountable junction box for receiving a conduit, said junction box having a front opening;
    a leveling tray disposed within said junction box and spaced vertically below said front opening, said leveling tray being adjustable with respect to said junction box; and
    a receptacle frame seated upon said leveling tray for mounting an electrical termination device of the conduit.

2. The adjustable electrical receptacle housing assembly as defined in claim 1, wherein the junction box includes side walls defining the front opening, and at least one flange extending inwardly from said side walls and wherein the leveling tray includes at least one adjustment screw connected to said flange such that when rotated in one direction, said adjustment screw causes the leveling tray to move toward the front opening and when rotated in the other direction, said adjustment screw causes the leveling tray to move away from the front opening.

3. The adjustable electrical receptacle housing assembly as defined in claim 2, wherein the leveling tray comprises a generally flat plate and wherein the at least one adjustment screw is rotatably fixed to said plate.

4. The adjustable electrical receptacle housing assembly as defined in claim 2, wherein the leveling tray comprises a top plate and at least one bottom plate which are fastened together and wherein the at least one adjustment screw includes a head being rotatably trapped between said top plate and said bottom plate.

5. The adjustable electrical receptacle housing assembly as defined in claim 1, wherein the leveling tray includes upwardly extending flanges and wherein the receptacle frame is sized to fit inwardly of and in close relationship with said flanges.

6. The adjustable electrical receptacle housing assembly as defined in claim 5, wherein the receptacle frame includes resilient wedge clips which bias against the inside surfaces of the leveling tray flanges for holding the receptacle frame within the leveling tray.

7. The adjustable electrical receptacle housing assembly as defined in claim 2, wherein the receptacle frame includes through holes adjacent respective adjustment screws for access to the adjustment screws through the receptacle frame.

8. The adjustable electrical receptacle housing assembly as defined in claim 1, wherein the junction box includes external flanges having adjustment screws for adjustable mounting of the junction box to a structure.

* * * * *